March 29, 1927.

J. C. SMALTZ 1,623,021

WINCH

Filed Aug. 3, 1925

INVENTOR

JOHN C. SMALTZ

BY

ATTORNEYS

March 29, 1927.  
J. C. SMALTZ  
1,623,021  
WINCH  
Filed Aug. 3, 1925  
2 Sheets-Sheet 2
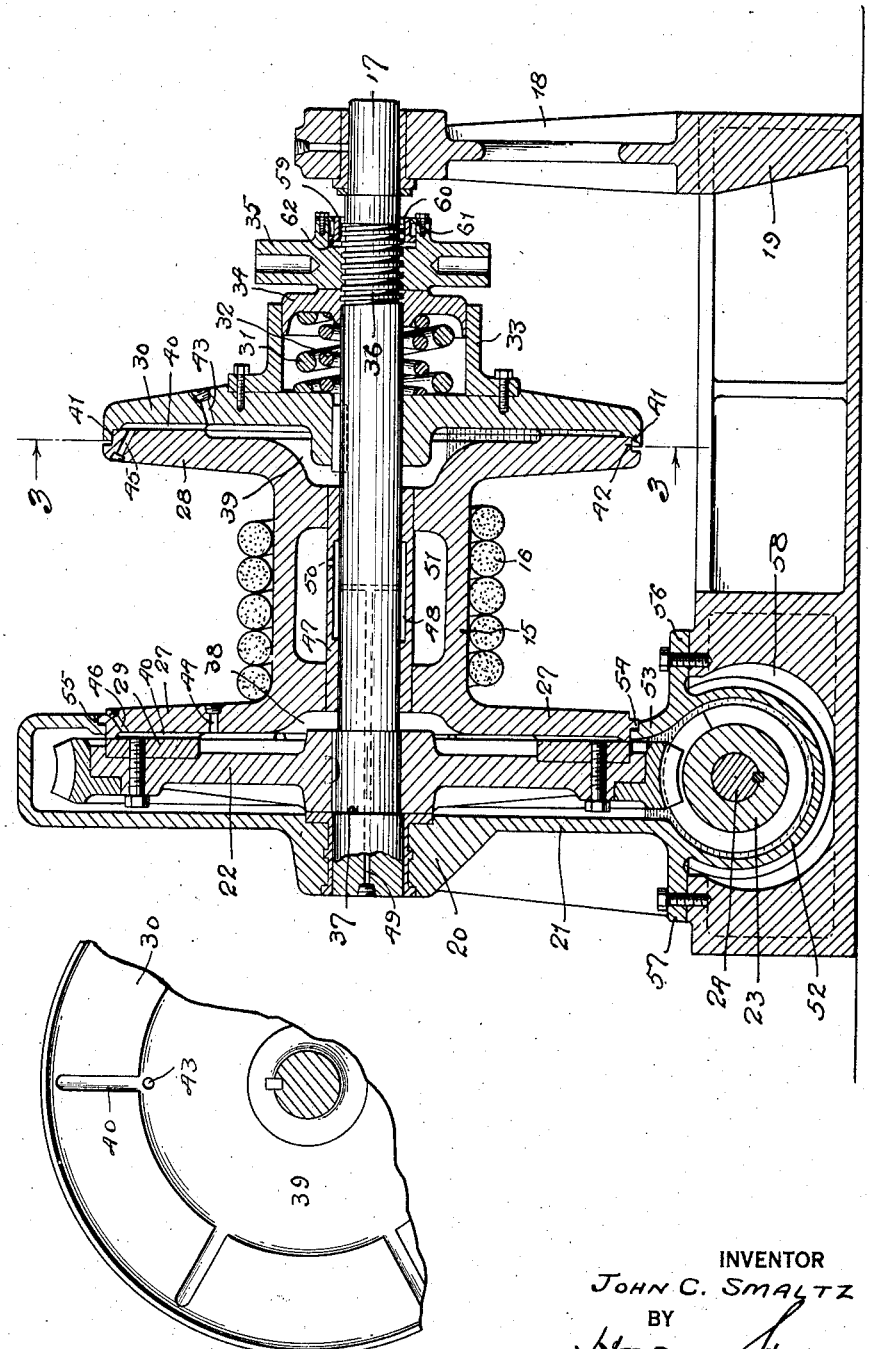
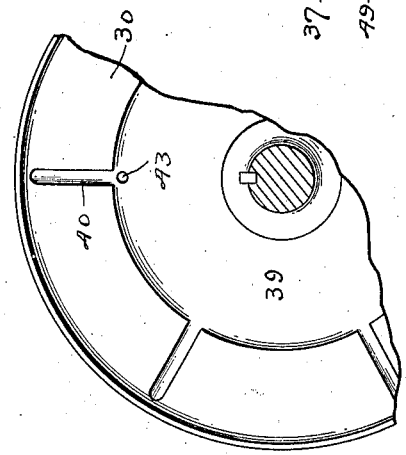
INVENTOR  
JOHN C. SMALTZ  
BY  
ATTORNEYS Patented Mar. 29, 1927.

1,623,021

UNITED STATES PATENT OFFICE.

JOHN C. SMALTZ, OF SHORT HILLS, NEW JERSEY.

WINCH.

Application filed August 3, 1925. Serial No. 47,848.

My invention relates to winches and particularly to winches of the slip-drum type. Among the objects of my invention may be mentioned specifically (1) the mounting of the drive gear and drum elements on the drum shaft in a manner such that the worm gear is maintained in proper alinement with the driving worm regardless of wear at the shaft bearing; (2) the lubrication of the friction heads of the drum; (3) improved lubrication of the several bearings of the winch; (4) certain improvements in detail of construction of the gear casing and winch parts which make for better service and durability.

In the accompanying drawings—

Fig. 2 is a section on the line 2—2, Fig. 1; and

Fig. 3 is a broken section on the line 3—3, Fig. 2.

Figure 1:
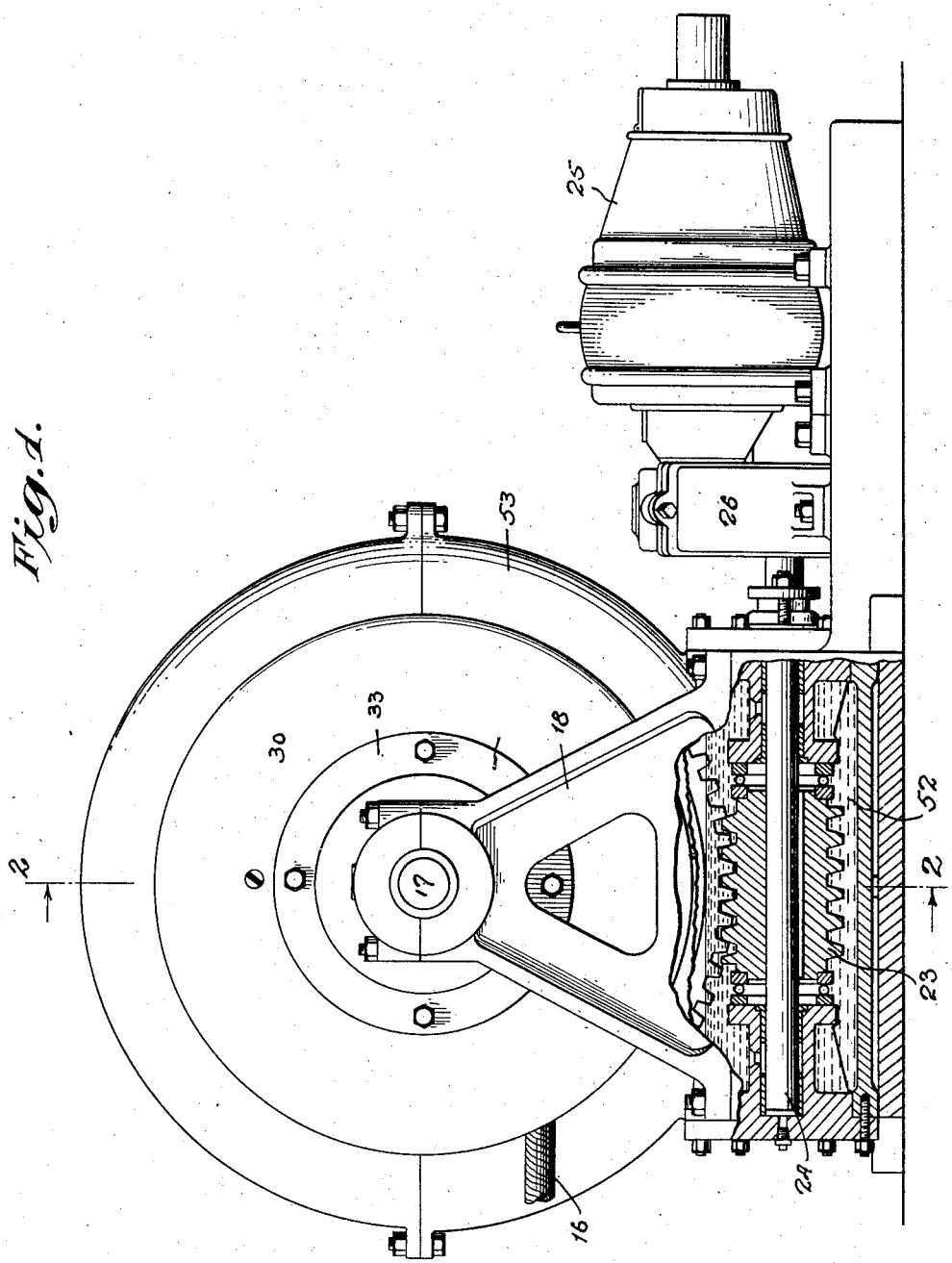
Fig. 1 is a broken side elevation of the winch in which my invention is embodied in one form.

The drum 15 of the winch on which the cable 16 is wound is mounted on the shaft 17 journalled at one end in the standard 18 rising from the base 19, and at its other end in the bearing boss 20 of the split casing 21 for the worm gear 22 keyed to the shaft 17. Meshing with the worm gear at its lower reach is a driving worm 23 fast on the driving shaft 24 which may be driven from any source of power, for example from the electric motor 25 through reduction gearing housed in the casing 26.

The drum heads 27 and 28 are engaged between, on the one hand, the friction ring 29 secured to the worm gear 22, and on the other hand, the friction disc 30 slidably keyed to the shaft 17. Heavy springs 31 and 32 housed within the sleeve 33 secured to the outer face of the disc 30, bear at one end against the latter and at their opposite ends against thrust cap 34. The nut 35 working in the threaded area 36 of the shaft regulates the stress imposed upon the thrust springs 31 and 32.

In winches of the present character it has heretofore been customary to permit the spring thrust to be taken up by the end bearing of the worm gear 22 against the boss 20 in which the shaft is journalled. Wear at this point results in the longitudinal displacement of the worm gear on the shaft until it is out of vertical alinement with the driving worm 23. It has consequently been necessary periodically to dismount the winch and take up the wear by interposed washers or the like which restore the worm wheel to proper vertical alinement with the worm. While this improves conditions it does not remedy the improper wear occasioned to the teeth of the worm wheel while it is out of register. Consequently, upon its restoration to proper position, objectionable friction occurs between the gears with resulting injury thereto. I have met this difficulty by providing the shaft with a shoulder 37 against which the hub of the gear 22 abuts. Inasmuch as the gear and shaft rotate together no wear occurs at this point, and the proper relation of the gear 22 with respect to the driving worm 23 is constantly maintained. It will of course be obvious that the shaft in the area between the shoulder 37 and the nut 35, is under tension as a result of this arrangement.

I have found it desirable to lubricate the bearing surfaces between the drum heads 27 and 28 and the friction members 29 and 30, not only in order to reduce the wear between these parts but also to silence the operation of the winch. For this purpose the hub of each drum head is recessed to form, with the opposed surface of the cooperating member, chambers 38—39 for the reception of lubricant. Radial channels 40 formed in one or both of the cooperating frictional surfaces, extend from the chambers 38 and 39 to a point adjacent the peripheral areas of these surfaces and form feed channels which lead the oil from the chambers 38 and 39 into the bearing area. The channels terminate short of the peripheries of these areas and the passages 40 are thus sealed against direct escape of the lubricant. The disc 30 is also provided with a peripheral shoulder 41 which receives the peripheral shoulder 42 of the drum head 28, thus not only centering the parts with respect to each other, but increasing the extent of the peripheral sealing surfaces.

Lubricant may be introduced into the chambers 38 and 39 through passages 43 and 44 formed respectively in the disc 30 and drum head 27 and closed by sealing plugs. In order to clean the channels 40 I provide adjacent their outer ends drainage passages 45 and 46 through which a cleansing fluid introduced to the chambers 38 and 39 may exit. The passages 40 may be thus kept clean for the feed of lubricant to the friction areas.

In spite of the lubricant between the friction surfaces, ample friction is exerted by the stress of the springs 31 and 32 to drive the drum under load, while at the same time the wear upon the friction surfaces is reduced and the winch is rendered practically silent in operation.

The drum 15 is mounted on the shaft 17 through a long bushing 47. The latter is relieved at 48 to receive oil introduced through the longitudinal bore 49 in the shaft. One or more openings 50 in the bushing admit oil from 48 to the reservoir 51 afforded by the central recess in the drum barrel. Inasmuch as the fit of the bushing 47 on the shaft is relatively loose, the oil may pass from the reservoir 51 to the end chambers 38 and 39, or vice versa. Thorough lubrication of the drum bearing on the shaft is thus insured.

Lubrication of the worm 23 is secured by filling the lower portion of the casing 21 with oil. The foot of the casing is cored to form a continuous side wall for the reservoir 52, one end of which is continued upward at the side wall of the casing 21, while its opposite wall 53 is shaped to the flange 27 of the drum. Inasmuch as this wall rises above the level of the meshing area of gear 52 and worm 23, the oil may flood the worm 23 without danger of escape. A lap joint 54 between the wall 53 of the reservoir and the drum flange 27, and a similar lap joint 55 between the upper portion of the casing and the upper margin of the flange, closes the casing against the entry of dust and moisture.

Foot pieces 56 and 57 integral with the lower portion of the casing rest upon the base 19 which is cored out at 58 to receive the reservoir portion of the casing.

Inasmuch as winches of this character are commonly exposed to the weather, I provide a guard 59 associated with the nut 35 and serving to protect the screw 36 against exposure when the nut is turned down. The guard consists of a sleeve arranged in a counter-sink in the outer face of the nut hub and provided with a retaining lug 60 which engages the end of the screw 36 and prevents the guard from following the nut as the latter moves down the thread. A retaining ring 61 secured on the outer face of the nut engages the flange 62 of the guard and prevents its escape.

The features to which especial attention has been directed greatly improve the life and service of the winch, and while the construction shown is the best now known to me, various modifications will readily occur to those skilled in the art which embody the underlying thoughts of what I claim as my invention.

I claim—

1. In a slip drum winch, a winding drum having a friction head, a cooperating friction member against which said head abuts, the adjacent faces of said parts being shaped to afford a chamber for lubricant, at least one of said faces being channelled to lead lubricant from said chamber to a point adjacent the periphery of the area of frictional engagement, together with means at the periphery of said area for preventing direct escape of the lubricant.

2. In a slip drum winch, a winding drum having a friction head, a cooperating friction member against which said head abuts, the adjacent faces of said parts being shaped to afford a chamber for lubricant, at least one of said faces being channelled to lead lubricant from said chamber to a point adjacent the periphery of the area of frictional engagement, said channelled member having a normally closed drainage passage communicating with said peripheral end of said distributing channel.

3. In a slip drum winch, a winding drum having friction heads at its opposite ends, cooperating driven friction members facing said heads, means constantly stressing said friction members against the drum heads, said opposed members being shaped to afford central reservoirs and channels for distributing lubricant from said reservoirs to the opposed frictional surfaces and thus to maintain a lubricating film therebetween.

In testimony whereof I have signed my name to this specification.

JOHN C. SMALTZ.